US008278117B2

(12) United States Patent
Yonezawa et al.

(10) Patent No.: US 8,278,117 B2
(45) Date of Patent: Oct. 2, 2012

(54) SAMPLE HOLDER FOR MALDI MASS SPECTROMETRIC ANALYSIS, AND MASS SPECTROMETRIC ANALYSIS METHOD

(75) Inventors: Tetsu Yonezawa, Sapporo (JP); Kimitaka Sato, Okayama (JP)

(73) Assignees: The University of Tokyo, Tokyo (JP); DOWA Electronics Materials Co., Ltd., Tokyo (JP)

( * ) Notice: Subject to any disclaimer, the term of this patent is extended or adjusted under 35 U.S.C. 154(b) by 0 days.

(21) Appl. No.: 13/429,570

(22) Filed: Mar. 26, 2012

(65) Prior Publication Data

US 2012/0187288 A1 Jul. 26, 2012

Related U.S. Application Data

(62) Division of application No. 12/666,656, filed as application No. PCT/JP2008/061936 on Jun. 25, 2008, now Pat. No. 8,168,441.

(30) Foreign Application Priority Data

Jun. 27, 2007 (JP) ................................ 2007-169784

(51) Int. Cl.
*G01N 24/00* (2006.01)

(52) U.S. Cl. ......................... 436/173; 250/287; 250/288

(58) Field of Classification Search ........................ None
See application file for complete search history.

(56) References Cited

FOREIGN PATENT DOCUMENTS

| | | |
|---|---|---|
| JP | 2-145422 | 6/1990 |
| JP | 62-43562 | 9/1994 |
| JP | 2005-502050 | 1/2005 |
| JP | 2006-201042 | 8/2006 |
| JP | 2007-169135 | 7/2007 |

OTHER PUBLICATIONS

Wei, J. et al., "Desorption-ionization mass spectrometry on porous silicon", Nature, May 20, 1999, pp. 243-246, vol. 399.

Kinumi, Tomoya et al., "Matrix-assisted laser desorption/ionization time-of-flight mass spectrometry using an inorganic particle matrix for small molecule analysis", Journal of Mass Spectrometry, Apr. 10, 2000, pp. 417-422, vol. 35, Issue 3.

Schurenberg, Martin et al., "Laser Desorption/Ionization Mass Spectrometry of Peptides and Proteins with Particle Suspension Matrixes", Analytical Chemistry, 01 1999 01, pp. 221-229, vol. 71, No. 1.

*Primary Examiner* — Yelena G Gakh
*Assistant Examiner* — Robert Xu
(74) *Attorney, Agent, or Firm* — Clark & Brody

(57) ABSTRACT

Used is a sample holder for MALDI mass spectrometry, which has a CuO secondary particle as a laser-beam-absorbing matrix and in which the secondary particle comprises an aggregate of CuO primary particles having an average particle diameter of 100 nm or smaller and has an uneven surface arising from the shape formed by the primary particles constituting the outermost surface of the secondary particle. As the CuO secondary particle, usable is one derived from a CuO powder produced by baking basic copper carbonate in air at 200 to 300° C., and the basic copper carbonate is produced in a process of mixing an aqueous ammonium hydrogencarbonate solution and an aqueous copper nitrate solution. The CuO secondary particle has an average particle diameter of, for example, from 0.3 to 10 μm.

2 Claims, 17 Drawing Sheets

SAMPLE HOLDER FOR MALDI MASS SPECTROMETRIC ANALYSIS, AND MASS SPECTROMETRIC ANALYSIS METHOD

TECHNICAL FIELD

The present invention relates to a sample holder for matrix-assisted laser desorption ionization-mass spectrometry (MALDI-MS) using inorganic fine particles as a laser-beam-absorbing matrix, and to a method of mass spectrometry using it. In this description, matrix-assisted laser desorption ionization-mass spectrometry is referred to as MALDI-MS.

BACKGROUND ART

In mass spectrometry that is an important method of analysis in organic chemistry, in general, an object substance is ionized in some method and the ion is desorbed and detected in a TOF apparatus using the difference of flight time between ions based on the difference in mass-to-charge ratio (m/z). It is known that a sample to be analyzed may be soft-ionized not requiring decomposition of the molecules thereof in MALDI mass spectrometry in which the sample is mixed with an organic low-molecular ionization assistant (matrix agent) and locally irradiated with laser (e.g., 337 nm), whereby the matrix agent absorbs the laser beam to cause rapid temperature elevation in only the irradiated site. The method is widely utilized as a means for analyzing compounds such as protein, synthetic polymer and the like in the field of Medicine, clinical medicine, food, polymer material and environment.

The matrix for use in MALDI mass spectrometry (in this description, this may be referred to as "laser-light-absorbing matrix") may be roughly grouped into the following types:

(a) Organic matrix having a double bond or an aromatic ring as a functional group, (b) Inorganic matrix comprising inorganic fine particles.

In the method, of using the above-mentioned organic matrix (a), it is important to investigate the optimum condition (type of the organic matrix and the solvent to be added to sample, their blend ratio, crystal state of the mixed crystal of sample and matrix) for every sample prior to analysis thereof. Naturally, the chemical reaction between the organic matrix and the organic compound sample may bring about some problems. In particular, the reaction in laser irradiation must be taken into consideration. The organic matrix itself is ionized and decomposed through laser irradiation, therefore producing many interfering ion peaks resulting from it. Accordingly, MALDI mass spectrometry using an organic matrix has an essential problem in that an organic compound having a relatively small molecular weight is especially difficult to analyze therein.

As the method of using the inorganic matrix of fine particles of the above (b), known is a method of mixing a suspension of inorganic fine particles (e.g., Co fine particles) coated with a high-viscosity liquid such as glycerin or the like, with a sample substance (Patent Reference 1). When inorganic fine particles are used directly as they are, then, in general, sample molecules may be strongly adsorbed by the inorganic fine particles (multipoint adsorption), and therefore the sample molecules could hardly be desorbed in laser irradiation and accurate mass spectrometry may be difficult. Inorganic fine particles of transition metals except some noble metals may be readily oxidized in air and their surface conditions often change, and therefore it is difficult to apply them to mass spectrometry directly as they are. In this connection, according to the above-mentioned method of coating with a high-viscosity liquid such as glycerin or the like, sample molecules may float in the high-viscosity liquid that covers the inorganic fine particles, and the sample molecules ionized through laser irradiation can be readily desorbed from the matrix. In addition, since the high-viscosity liquid could serve as a protective agent, aerial oxidation in the case of using metal fine particles may be prevented. However, in a mass spectrometer, the ion source part is in high vacuum, therefore causing a problem of apparatus contamination with the protective agent such as glycerin or the like. Accordingly, at present, the method is not almost used.

Also proposed is a method of forming a functional group in the surface of silica particles through surface treatment and using the particles as a matrix (Patent Reference 2). However, the method requires preparation of suitable surface treatment according to the sample substance to be analyzed, and the operation is complicated. In addition, the substance adhered by the surface treatment may cause interfering ion peaks.

In addition, other some metal nanoparticles are proposed as a matrix; however, the reducing agent to be added in producing metal nanoparticles and the surface-protective agent for nanoparticles often cause interfering ion peaks, and therefore analysis of low-molecular-weight organic compounds is still difficult.

On the other hand, also known is a DIOS method of using a porous surface substrate having a fine pore structure of several tens nm, as one utilizing the substrate itself on which a sample substance is put, as a laser-beam-absorbing ionization medium (Non-Patent Reference 1). Above all, the DIOS method of using porous silicon has been already put into practical use, which suffers from few interfering ion peaks derived from the laser-beam-absorbing ionization medium in the region of analyzing substances having a molecular weight of not larger than 1000. However, this still has a problem of durability in that the silicon surface is readily oxidized in air and the ionization efficiency is thereby greatly lowered.

Further, it is said that, in the DIOS method, sample substrates having the same porous structure are difficult to produce with good reproducibility, and in addition, a problem is pointed out in that the method is not so much suitable for repeated measurement since washing the porous substrate once used for measurement is not easy. Accordingly, in Patent Reference 3, solving the problems with the DIOS method is tried by using a crystalline element having the property of absorbing laser beams at high efficiency (pyro-electric element having a property of spontaneous polarization based on the temperature changes, and ferroelectric element) as a sample substrate. However, the method indispensably requires preparation of a special sample substrate, in which, therefore, commercially-available sample substrates for MALDI mass spectrometry (SiC substrate, etc.) could not be used. Accordingly, at present, the method lacks popularity and the cost in measurement is high.

Patent Reference 1: JP-A 62-43562

Patent Reference 2: JP-T 2005-502050

Patent Reference 3: JP-A 2006-201042

Non-Patent Reference 1: Wei, J., Buriak, J. M., Siuzdak, G.; Nature 1999, 399, 243-6

Problems that the Invention is to Solve

As mentioned in the above, for current MALDI mass spectrometry, no one has established a simple method of good popularity capable of analyzing low-molecular-weight organic compounds with good accuracy, suffering from few interfering ion peaks.

In consideration of the current situation as above, the present invention is to provide a method of using, as a matrix, inorganic fine particles not requiring any special material for the sample substrate, in which a sample substance is directly held by the matrix particles not via a substance that may cause interfering ion peaks, thereby enabling an accurate technique of MALDI mass spectrometry.

Means for Solving the Problems

As a result of various investigations, the present inventors have found that using a copper oxide powder of aggregates of CuO nanoparticles as a laser-beam-absorbing matrix enables extremely simple and highly accurate MALDI mass spectrometry.

Specifically, in the invention, there is provided a sample holder for MALDI mass spectrometry having a CuO secondary particle as a laser-beam-absorbing matrix, wherein the secondary particle comprises an aggregate of CuO primary particles having an average particle diameter of 100 nm or smaller and has an uneven surface arising from the shape formed by the primary particles constituting the outermost surface of the secondary particle.

The sample holder is loaded in a MALDI analyzer while holding a sample to be analyzed thereon, and this has at least an electroconductive substrate (e.g., stainless substrate) and a CuO secondary particle carried by the substrate as the constitutive elements thereof. The average particle diameter of the primary particles is determined as follows: The CuO primary particles are observed with a field-emission scanning electronic microscope (FE-SEM), 200 or more particles (except the particles of which the entire particle shape could not be confirmed) are randomly selected on the FE-SEM image, the length of the longest part (major diameter) of each particle appearing on the image is measured, and the found data are averaged to give the average particle diameter.

As the above-mentioned CuO secondary particle, employable is one derived from a CuO powder produced by baking basic copper carbonate in air at 200 to 300° C., in which the basic copper carbonate is prepared in a process of mixing an aqueous ammonium hydrogencarbonate solution and an aqueous copper nitrate solution. The average particle diameter of the CuO secondary particles is, for example, from 0.3 to 10 μm. The average particle diameter of the secondary particles is determined by analyzing the CuO powder that has been suitably ground to the condition for use in a sample holder, using a laser diffraction particle sizer.

The invention also provides a method of MALDI mass spectrometry using the above-mentioned sample holder, which comprises a step of dispersing CuO secondary particles each comprising an aggregate of CuO primary particles with an average particle diameter of 100 nm or smaller and having an uneven surface arising from the shape formed by the primary articles constituting the outermost surface of the secondary particle, in a liquid medium; a step of applying the dispersion onto a sample substrate for MALDI mass spectrometry followed by drying it thereon to give a sample holder carrying the CuO secondary particles therein; a step of applying a sample solution of an organic compound (sample substance) to be analyzed, as dissolved therein, onto the CuO secondary particles-carrying sites of the sample holder followed by drying it thereon to make the sample substance adhere to CuO; and a step of setting the sample holder in a MALDI mass spectrometer followed by irradiating it with pulse laser so as to make the CuO secondary particles function as a laser-beam-absorbing matrix to ionize the sample substance. In case where the method is directed to an organic compound having a molecular weight of from 100 to 5000, preferably from 200 to 5000 or so as the sample substance therein, then it enables especially good analysis.

The invention has the following advantages in MALDI mass spectrometry.

(1) Based on the specific uneven morphology of the matrix particle surface, sample molecules are adhered to the matrix, therefore not requiring intervention of a high-viscosity liquid such as glycerin or the like and a substance having a functional group. Accordingly, the method is basically free from interfering ion peaks resulting from such substances.

(2) Since the sample molecules may adhere to the matrix in such a manner that they are readily desorbable from it owing to the specific uneven morphology of the matrix, the accuracy in determination of the molecular weight distribution is high.

(3) Since the matrix particles are oxide, they are hardly degraded (oxidized) in air. Accordingly, they are excellent in handlability and do not require any protective agent, therefore not producing interfering ion peaks derived from it.

(4) The matrix itself has few decomposition peaks.

(5) The reaction between the sample substance and the matrix and the formation of mixed crystals may not be taken into consideration, and therefore the sample substance can be analyzed in simple operation irrespective of the type thereof. Specifically, the invention secures rapid performance and popularity in mass spectrometry.

(6) The invention secures accurate analysis of sample substances having a low molecular weight of at most 1000 and even less than 500, and is therefore suitable to analysis of various surfactants and chemical agents. In addition, since the invention secures high-level analytical precision even for minor constituents, it is expected to be applicable to doping tests for human and livestock.

PREFERRED EMBODIMENTS

Figure 1:
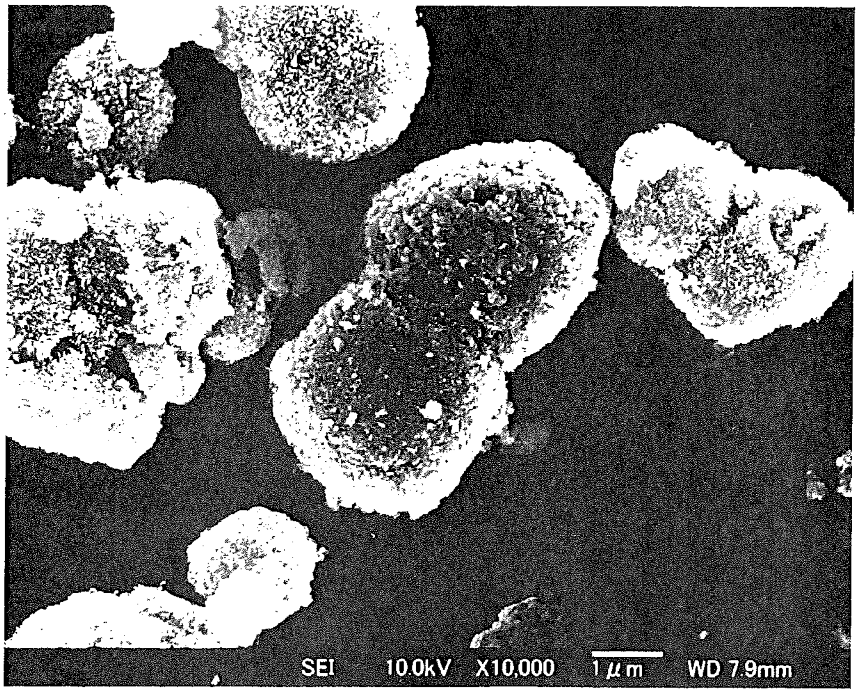
FIG. 1 is an FE-SEM picture of copper oxide powder particles used in Examples.
Figure 2:
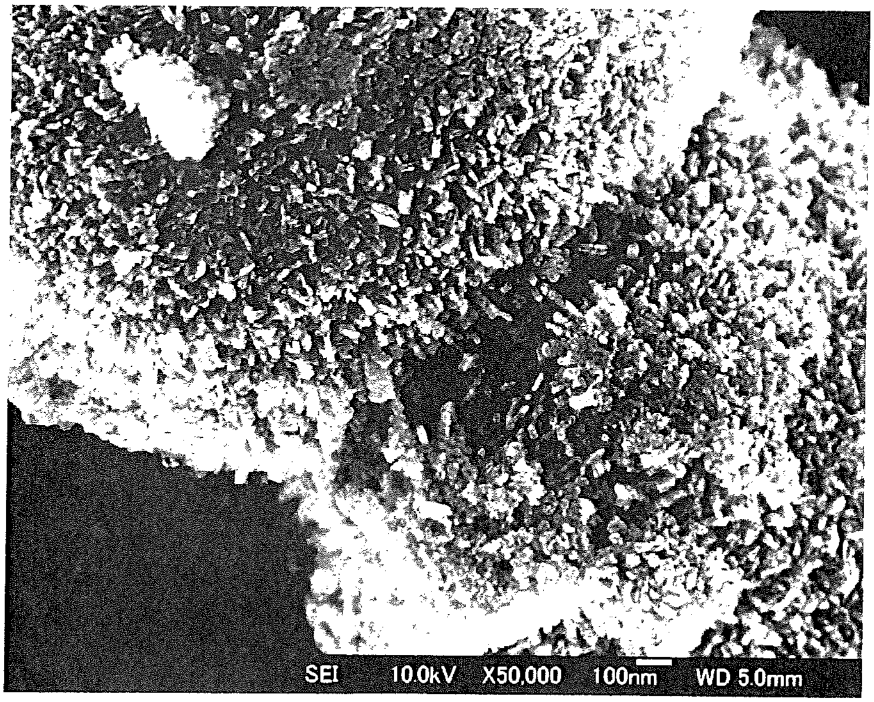
FIG. 2 is an FE-SEM picture of copper oxide powder particles used in Examples.
Figure 3:
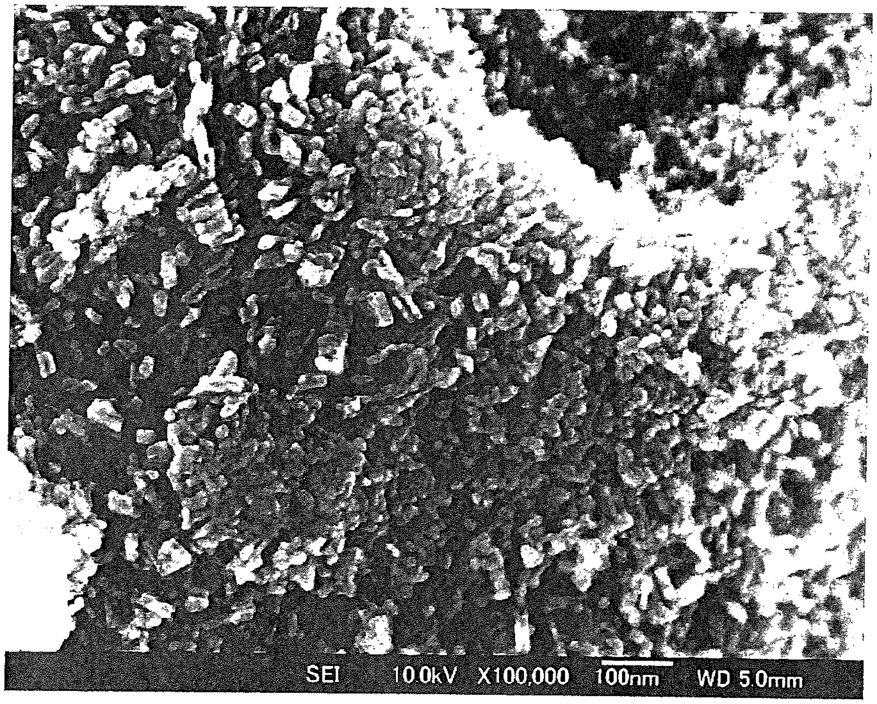
FIG. 3 is an FE-SEM picture of copper oxide powder particles used in Examples.

FIG. 1 to FIG. 3 are FE-SEM pictures of copper oxide powder particles applicable to the invention. In FIG. 2 and FIG. 3, the particles in FIG. 1 are observed at higher magnifications. The copper oxide powder is produced in "Production Example 1 for copper oxide powder" to be given below. The powder particles seen on FIG. 1 do not have a smooth surface condition. As seen on FIG. 2 and FIG. 3, the surface comprises fine nanoparticles. As a result of investigations, the nanoparticles are primary particles of CuO crystal, and the powder particles are aggregates of the CuO primary particles, or that is, CuO secondary particles.

Figure 4:
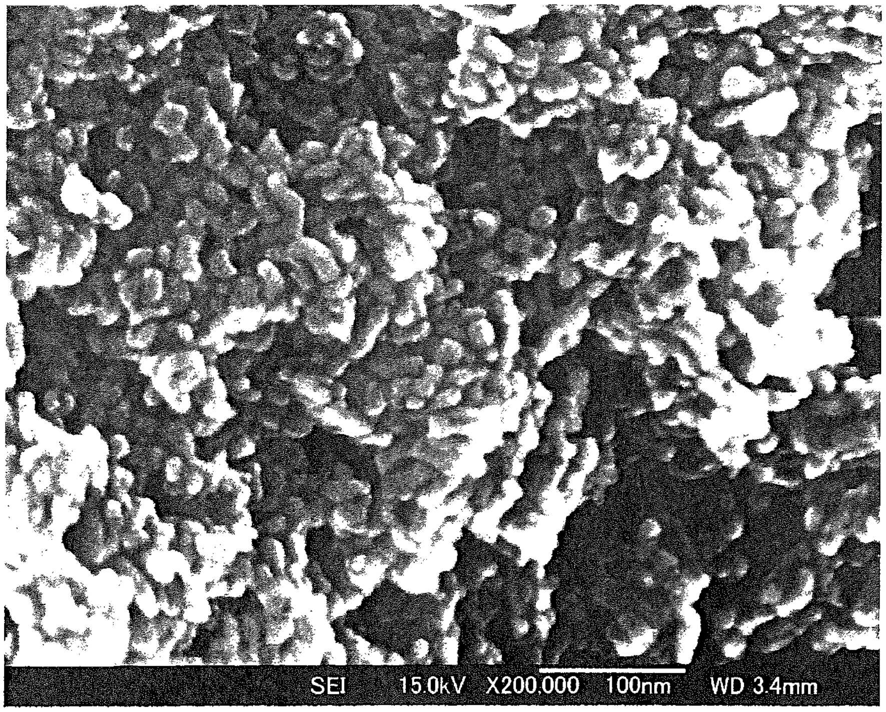
FIG. 4 is an FE-SEM image showing the surfaces of the CuO secondary particles produced by grinding the copper oxide particles in FIG. 1 by ultrasonic vibration.

When ultrasonic vibration is given to the copper oxide powder of the CuO secondary particles in a liquid medium such as water, alcohol or the like, then the secondary particle may be readily ground into a few particles. FIG. 4 is an FE-SEM picture showing the surfaces of the ground particles produced by imparting ultrasonic vibration thereto in water, as observed at a high magnification. In the process of producing the sample holder for MALDI mass spectrometry of the invention, a dispersion of CuO particles is prepared, using the copper oxide powder as in FIG. 1, and the process may comprise an operation of imparting ultrasonic vibration to the particles, as in Examples. In the case, the particles are ground, and therefore, the CuO particles to constitute the sample holders produced in Examples are secondary particles having a specific uneven surface morphology arising from the shape of the CuO primary particles, as in FIG. 4.

It is considered that the specific uneven surface morphology of the CuO secondary particles constituting the sample holder of the invention may significantly function in increasing the accuracy in determination of the molecular weight distribution of the sample. At this time the action is not as yet clarified in many points, but may be considered as follows:

Specifically, when the surfaces of the matrix particles are even, then there may be a high possibility that the sample molecules could adhere to the particles in a mode of so-called multipoint adsorption. It is considered that electron transfer based on coordinate bonding may participate in the adsorption mechanism, and in this case, the sample molecule may have a coordinate bond to the matrix particle in many sites thereof. If so, since the bonds at all the adsorption points could not always be cut at the same time by heating through laser bean irradiation, the proportion of the sample molecules not ionized and not desorbed from the matrix increases, and this may be a cause of lowering the accuracy in measurement of molecular weight distribution (see Comparative Examples 1 and 2 given below).

As opposed to this, the CuO secondary particles constituting the sample holder of the invention have the above-mentioned specific uneven surface morphology. In this case, it is considered that the adsorption state of the sample molecules to the particles may be such that the degree of multipoint adsorption greatly lowers but rather the sample molecules may adhere to the matrix particles likely in a condition of single-point adsorption. As a result, it may be presumed that, by heating through laser bean irradiation, the sample molecules may be stably ionized and desorbed from the matrix, therefore bringing about the significant enhancement of the accuracy in measurement of the molecular weight distribution thereof.

The CuO primary particles of constituting the matrix particles (CuO secondary particles) in the invention are directed to those having an average particle diameter of at most 100 nm. When the primary particle diameter is larger than the above, then there may be a risk of increasing the degree of multipoint adsorption. In addition, the particles may be ground separately into individual primary particles, and if so, an adsorption state near to single-point adsorption could not be expected. More preferably, the average particle diameter of the CuO primary particles is at most 60 nm. According to the method of "Production Examples 1 to 3 for copper oxide powder" given below, copper oxide powders in which the average particle diameter of the primary particles is within a range of from 10 to 100 nm can be obtained.

The matrix particles of CuO secondary particles for use herein may be any ones conditioned in various sizes so far as they have a specific uneven surface morphology arising from the shape of the primary particles as in the above-mentioned FE-SEM pictures; however, when the particle diameter of the secondary particles is too small, then the difference in the particle diameter between the secondary particles and the primary particles may reduce, and an effective single-point adsorption morphology could not be realized. As a result of various investigations, the average particle diameter of the secondary particles is preferably at least 0.3 μm. Too rough secondary particles may be readily ground and are unstable, and therefore it is desirable to use secondary particles having an average particle diameter of nearly at most 10 μm. According to the method of "Production Examples 1 to 3 for copper oxide powder" to be given below, copper oxide powders of CuO secondary particles having an average particle diameter of from 1 to 10 μm or so can be produced. Such CuO secondary particles may be used as matrix particles directly as they have the size; preferably, however, they are ground by ultrasonic vibration into more stable CuO secondary particles for use herein.

The sample holder for MALDI mass spectrometry of the invention may be produced, for example, as follows:

First prepared is a copper oxide powder that comprises CuO secondary particles of aggregates of CuO primary particles having an average particle diameter of at most 100 nm, preferably from 10 to 60 nm. When the amount of impurities in the powder is large, then they may cause interfering ion peaks; and therefore, a powder having a highest possible purity is preferred for use herein. For example, preferred is a high-purity copper oxide powder in which the Cu content is at least 97% by mass and the content of Fe, Ni, Al and Si is at most 10 ppm each, in terms of the content of the constitutive elements except oxygen. The copper oxide powder of the type can be produced, for example, according to the method disclosed in Japanese Patent Application No. 2005-372946. Concretely, the method according to "Production Examples 1 to 3 for copper oxide powder" to be given below may be employed.

Next, the copper oxide powder is dispersed in a liquid medium to give a dispersion (hereinafter this may be referred to as "matrix dispersion"). As the liquid medium, usable are water, alcohol, etc. In the step of producing the dispersion, ultrasonic vibration is preferably imparted thereto. Accordingly, the CuO secondary particles just produced in the step may be ground into secondary particles having a smaller particle diameter in some degree and could be more stable.

The matrix dispersion is dropwise applied onto a sample substrate (e.g., electroconductive SiC substrate) for MALDI mass spectrometry. Then, the liquid is dried. As a result, a sample holder can be constructed, which carries the CuO secondary particles as a laser-beam-irradiation matrix therein.

The sample substance may be directed to various organic compounds. In particular, in a molecular weight range of at most 5000, clear analysis with few noises is possible, and the effect of applying the invention to that range is great. In addition, the method of the invention is also suitable to analysis of low-molecular-weight surfactants and chemicals having a molecular weight of at most 1000 and even less than 500. Specifically, for analysis of organic compound-having a molecular weight of from 100 to 5000 or so, the invention exhibits an especially excellent effect.

In analysis, a sample solution of an organic compound (sample substance) to be analyzed is applied onto the sample holder at the CuO secondary particles-carrying sites thereof using a method of dropping wise or the likes, and then dried. As a result, the sample substance adheres to the matrix of CuO secondary particles. As the sample solution, water is preferably used for the solvent; but organic solvents may be suitably used for water-insoluble samples. However, it is important to select a liquid medium which is not reactive with the sample substance and of which the peaks in mass spectrometry are readily separable. In case where the sample is a neutral substance, a small amount of an ionizing agent such as NaO or the like is preferably added thereto. When the sample holder of the invention is used, the matrix therein is CuO and the matrix does not have any intervening specific substance, and therefore, the reactivity between the sample substance and the matrix may not almost be taken into consideration, and various samples may be analyzed in the same operation.

After the sample holder that holds a sample substance therein in the manner as above is set in a MALDI mass spectrometer and then irradiated with pulse laser beams, whereby the CuO secondary particles can well function as a laser-beam-absorbing matrix and the sample substance can be ionized efficiently and can be desorbed.

[Production Example 1 for Copper Oxide Powder]

Copper nitrate hydrate ($Cu(NH_3)_2.nH_2O$) having a purity of at least 99.9% and ammonium hydrogencarbonate ($NH_4HCO_3$) having a purity of at least 95% were prepared.

20 kg of the copper nitrate was put into a tank having an inner capacity of 60 L, and dissolved in 35 L of pure water having an electroconductivity of 1 μS added thereto, using a stirrer for 10 minutes, thereby preparing an aqueous copper nitrate solution having a Cu concentration of 162 g/L. The dissolution temperature was 20° C.

On the other hand, 15 kg of the ammonium hydrogencarbonate was put into a tank having an inner capacity of 200 L, and dissolved in 150 L of pure water having an electroconductivity of 1 μS added thereto, using a stirrer, thereby preparing an aqueous ammonium hydrogencarbonate solution having a concentration of 100 g/L. The dissolution temperature was 15° C., and the ammonium hydrogencarbonate was completely dissolved in a stirring time of 60 minutes.

Thus dissolved, the aqueous ammonium hydrogencarbonate solution was stirred, and the above-mentioned aqueous copper nitrate solution was continuously added thereto at a speed of 3 L/min for neutralization. In this step, a three blade and one stage stirrer was used, and this was disposed in the 200 L tank at a position of 7 cm from the center of the bottom thereof. The revolution speed of the stirrer was 150 rpm.

Nucleation was completed in 20 minutes to finish the reaction, thereby producing slurry-like basic copper carbonate. The temperature of the reaction liquid was 15° C.

The obtained slurry-like basic copper carbonate was put into a top-discharging centrifuge for solid-liquid separation therein. After the whole amount of the reaction liquid was processed for solid-liquid separation and when the filtrate was no more discharged, warm pure water at 60° C. was put into the top-discharging centrifuge through its liquid supply port to wash the contents for 50 minutes. The amount of the warm pure water used was about 1200 L. After thus washed, the residual ammonia concentration in the slurry-like basic copper carbonate was 500 ppm.

The residual ammonia concentration was determined by dissolving the residual ammonia in the slurry-like basic copper carbonate in pure water followed by measuring the ammonia concentration in the pure water with an ion chromatograph (by Dionex).

Thus obtained, the washed slurry-like basic copper carbonate was dried in a forced ventilation-type drier at a temperature of 110° C. for 17 hours, thereby giving basic copper carbonate particles. Thus obtained, the particles of basic copper carbonate ($CuCO_3.Cu(OH)_2.nH_2O$) were analyzed with a field-emission scanning electronic microscope (FE-SEM), and the average particle diameter of the primary particles of basic copper carbonate was about 30 nm. These were further analyzed with a laser diffraction particle sizer, which confirmed that the secondary particles of basic copper carbonate were aggregates of high uniformity having an average particle diameter of 2 μm. The method of computing the average particle diameter of the primary particles with TEM is as mentioned above. The average particle diameter of the secondary particles was measured with a dry-type laser diffraction particle sizer, Windox's HELOS & RODOS, under a dispersion pressure of 3.00 bar and a suction pressure of 125.00 mbar.

Next, the dry basic copper carbonate was divided into about 10 stainless vats, and baked in air at a temperature of 250° C. for 10 hours to give copper oxide. As a result of X-ray diffractometry thereof, the copper oxide was identified as CuO.

The copper oxide powder was analyzed in the same manner as above to determine the average particle diameter of the primary particles and that of the secondary particles. As a result, the average particle diameter of the CuO primary particles was 40 nm, and the average particle diameter of the secondary particles was 2 μm; and they were the same as those of the unbaked basic copper carbonate.

The copper oxide powder was analyzed for constitutive elements except oxygen; and the copper quality of the copper oxide powder was Cu>98% by mass, and Fe<1 ppm, Ni<1 ppm, Al<10 ppm, and Si<10 ppm. The concentration of Fe, Ni, Al and Si was determined through ICP analysis, and the Cu content was computed according to a subtraction method.

Further, it was confirmed that the BET specific surface area of the copper oxide powder was within a range of from 50 to 70 $m^2/g$.

The FE-SEM pictures of particles in the above-mentioned FIGS. 1 to 3 show the particles of the copper oxide powder produced in this Example.

[Production Example 2 for Copper Oxide Powder]

A copper oxide powder was produced according to the same method as in the above-mentioned Production Example 1 for copper oxide powder, for which, however, the pure water temperature in washing with warm pure water was changed to 20° C. The residual ammonia concentration in the intermediate substance, basic copper carbonate was 0.1%. The particles were analyzed for the average particle diameter thereof according to the above-mentioned method. The average particle diameter of the primary particles of basic copper carbonate was 50 nm; and the secondary particles were aggregates of high uniformity having an average particle diameter of 3 μm.

The average particle diameter of the CuO primary particles of the obtained copper oxide powder was 30 nm, and the average particle diameter of the secondary particles was 3 μm; and they were the same as those of the unbaked basic copper carbonate.

[Production Example 3 for Copper Oxide Powder]

The same copper nitrate and ammonium hydrogencarbonate as those used in the above-mentioned Production Example 1 for copper oxide were prepared.

20 kg of the copper nitrate was put into a tank having an inner capacity of 200 L, and dissolved in 35 L of pure water having an electroconductivity of 1 μS added thereto, with stirring with a stirrer for 10 minutes, thereby preparing an aqueous copper nitrate solution having a Cu concentration of 200 g/L. The liquid temperature was controlled to be 26° C.

On the other hand, 15 kg of the ammonium hydrogencarbonate was put into a tank having an inner capacity of 200 L, and dissolved in 150 L of pure water having an electroconductivity of 1 μS added thereto, using a stirrer, thereby preparing an aqueous ammonium hydrogencarbonate solution having a concentration of 100 g/L. The dissolution temperature was 26° C., and the ammonium hydrogencarbonate was completely dissolved in a stirring time of 60 minutes. The liquid temperature of the aqueous ammonium hydrogencarbonate solution was kept controlled to be 26° C. as such, and this was used as a neutralizing agent.

Next, thus used as a neutralizing agent, the aqueous ammonium hydrogencarbonate solution of which the liquid temperature was controlled to be 26° C. was continuously introduced into the 200 L tank filled with the aqueous copper nitrate solution, little by little via a metering pump. In the introducing step, the temperature inside the 200 L tank filled with the aqueous copper nitrate solution was so controlled, using a temperature controller, that the reaction temperature could be 26° C. or so (±1° C.). Then, using the same stirrer as in the above-mentioned Production Example 1 for copper oxide powder and under the same stirring condition as therein, the aqueous copper nitrate solution was neutralized, taking 45 minutes, to thereby produce slurry-like basic copper carbonate.

The obtained slurry of basic copper carbonate was put into a top-discharging centrifuge for solid-liquid separation therein. After the whole amount of the reaction liquid was processed for solid-liquid separation and when the filtrate was no more discharged, warm pure water at 20° C. was put into the top-discharging centrifuge through its liquid supply port to wash the contents for 3 hours. The washing operation was repeated twice. The amount of the warm pure water used was about 9000 L. After thus washed, the residual ammonia concentration in the slurry-like basic copper carbonate was 0.6%. The method for analysis was the same as above.

Thus obtained, the washed slurry-like basic copper carbonate was dried in a forced ventilation-type drier at a temperature of 110° C. for 24 hours, thereby giving basic copper carbonate particles. The particles were analyzed for the particle diameter according to the above-mentioned method. As a result, the average particle diameter of the primary particles of basic copper carbonate was 50 nm, and the particle diameter of the secondary particles fluctuated within a range of from 1 to 10 μm.

Next, the dry basic copper carbonate was baked in air under the above-mentioned condition to give copper oxide. As a result of X-ray diffractometry thereof, the copper oxide was identified as CuO.

The copper oxide powder was analyzed for the particle diameter of the primary particles and the secondary particles in the same manner as above. As a result, the average particle diameter of the CuO primary particles was 60 nm, and the particle diameter of the secondary particles fluctuated within a range of from 1 to 10 μm; and they were the same as those of the unbaked basic copper carbonate.

The copper oxide powder was analyzed for constitutive elements except oxygen; and the copper quality of the copper oxide powder was Cu>97% by mass, and Fe<1 ppm, Ni<1 ppm, Al<10 ppm, Si<10 ppm, and C: 0.5%.

Further, it was confirmed that the BET specific surface area of the copper oxide powder was within a range of from 40 to 50 $m^2/g$.

EXAMPLES

Example 1

[Preparation of Sample Liquid]

The sample to be analyzed herein is a reagent, polyethylene glycol (PEG 1000). 10 g of PEG 1000 was taken, added to 1 mL of distilled water, and completely dissolved therein by imparting ultrasonic vibration thereto for 15 minutes: Next, this was diluted 10-fold to give a polyethylene glycol solution having a concentration of 1 mg/mL.

On the other hand, NaI was used as an ionizing agent. 10 g of NaI was taken, and completely dissolved in 1 mL of distilled water added thereto. Next, this was diluted 10-fold to give an NaI solution having a concentration of 1 mg/mL.

The above-mentioned polyethylene glycol solution and NaI solution having the same concentration were mixed in a ratio by volume of [polyethylene glycol solution]/[NaI solution]=–5/1, to prepare a sample liquid.

[Preparation of Matrix Dispersion]

The copper oxide (CuO) powder obtained in the above-mentioned "Production Example 1 for copper oxide powder" was used as a material for a laser-beam-absorbing matrix. 500 mg of the copper Oxide powder was added to 5 mL of methanol, and ultrasonic vibration was imparted thereto for 1 hour. Accordingly, the particles (CuO secondary particles) of the copper oxide powder were ground in some degree to give CuO secondary particles having an average particle diameter within a range of from 0.3 to 2 μm. Of the secondary particles, the average particle diameter of the CuO primary particles, as determined on the TEM projected image in the manner described above, was 30 nm, and the secondary particles had a specific uneven surface (see FIG. 4) arising from the shape formed by the primary particles constituting the outermost surface of the secondary particle. The dispersion was further diluted 30-fold to prepare a matrix dispersion.

[Formation of Sample Holder]

A commercially-available, stainless sample substrate for MALDI mass spectrometry was prepared. 0.5 μL of the above-mentioned matrix dispersion was dropwise applied onto the sample substrate to coat it. Next, the coating liquid was dried, thereby giving a sample holder with CuO secondary particles carried on the stainless substrate.

[Application of Sample Substance]

0.5 μL of the above-mentioned sample liquid was dropwise applied onto the sample holder at the CuO secondary particles-carrying sites thereof, thereby coating the sample holder. Next, the sample liquid was dried, and the sample substance was thus held by the sample holder, as adhered to CuO.

[Analysis]

The sample substance-holding sample holder was set in a MALDI mass spectrometer (Shimadzu Seisakusho's AXIMA-CFR), then irradiated with pulse laser beams (337 nm), whereby the CuO secondary particles were made to function as a laser-beam-absorbing matrix. The sample molecules ionized and desorbed from the CuO matrix were analyzed with a TOF mass spectrometer.

Figure 6:
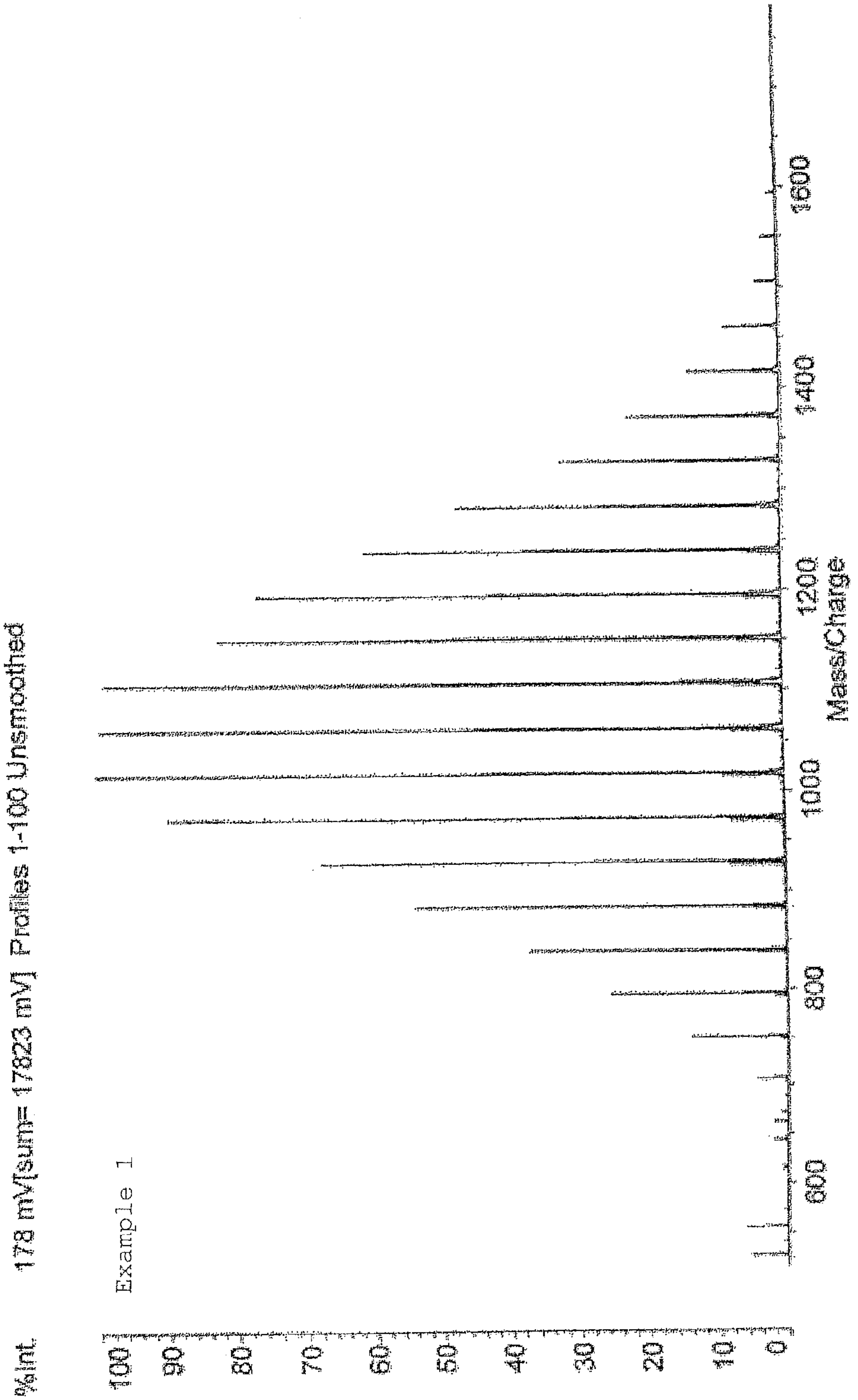
FIG. 6 is a molecular weight distribution spectrum showing the result of analysis in Example 1.

The result of analysis is shown in FIG. 6. It is known that the molecular weight distribution of the sample, polyethylene glycol reagent shows a nearly normal distribution (the same shall apply to the polyethylene glycol reagents mentioned below). As in FIG. 6, the spectrum reflects the normal distribution, and the noise level is extremely low. No interfering ion peaks are seen.

Since the matrix particles are secondary particles having a specific uneven surface morphology arising from the shape of the CuO nanoparticles (primary particles), it may be presumed that the adsorption state of the sample molecules could be similar to single-point adsorption and the adsorbed molecules could be smoothly ionized and desorbed through laser beam irradiation.

Comparative Example 1

A reagent, polyethylene glycol (PEG 1000) was analyzed according to the same method as in Example 1, for which, however, commercially-available CuO powder particles (by Nissin Chemco, Ltd.) were used as the laser-beam-absorbing matrix, in place of the CuO secondary particles in Example 1.

Figure 5:
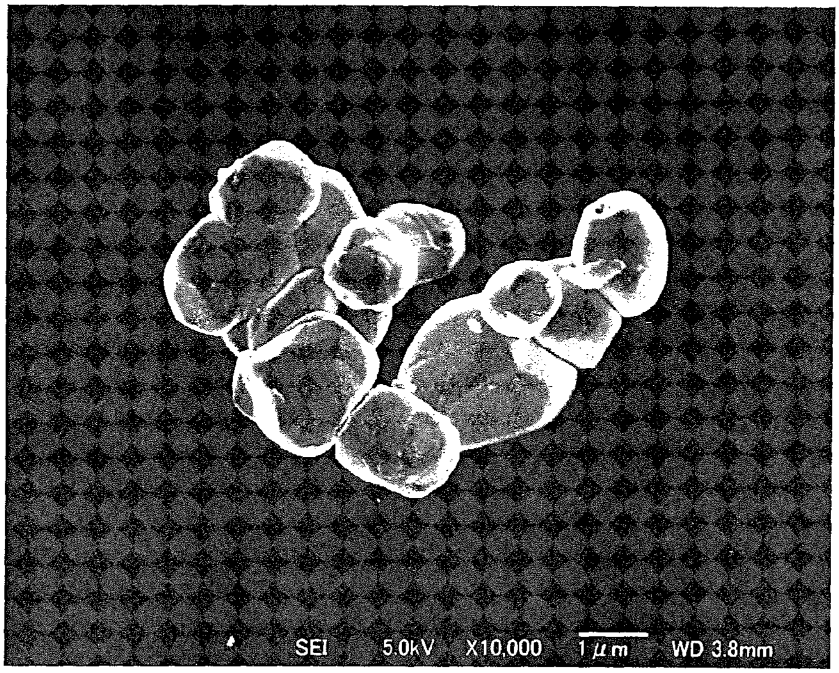
FIG. 5 is an FE-SEM picture of copper oxide powder particles used in Comparative Examples.

The FE-SEM picture of the CuO particles used is in FIG. 5. The individual μm-order particles each had a smooth surface, and it is considered that they themselves are primary particles of CuO.

Figure 7:
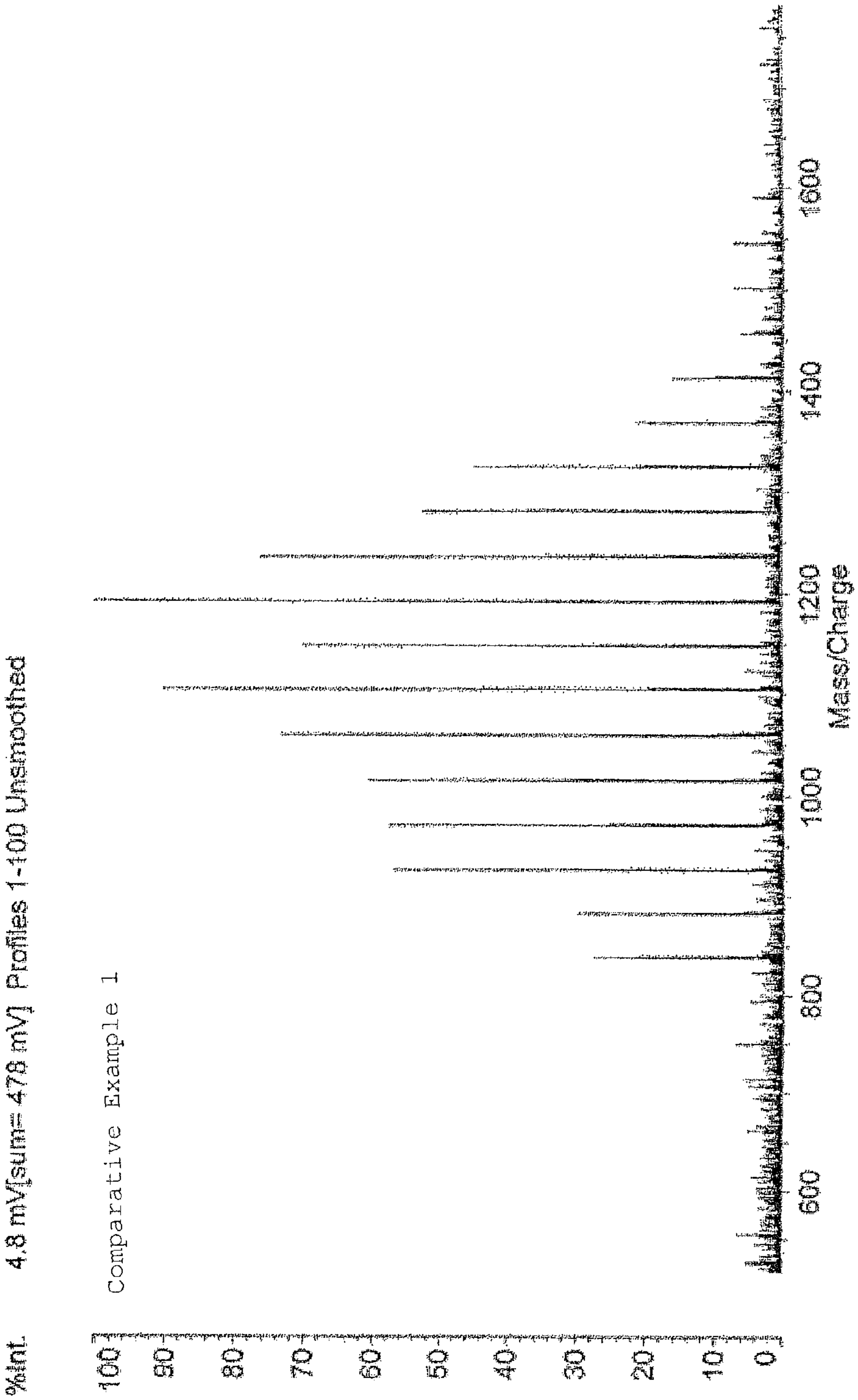
FIG. 7 is a molecular weight distribution spectrum showing the result of analysis in Comparative Example 1.

The result of analysis is shown in FIG. 7. The absolute number of the detected sample molecules was smaller than in Example 1; and in the spectrum where the maximum frequency was normalized to 100%, the noise was more remarkable in FIG. 7 (Comparative Example 1) than in FIG. 6 (Example 1), and the shape of the normal distribution was deformed in the former. No interfering ion peaks are seen.

Since the CuO particles of the matrix have a smooth surface, it is presumed that the degree of multipoint adsorption in the coating morphology of the sample molecules over the matrix may be larger than in Example 1 and therefore ionization and desorption of the sample molecules through laser beam irradiation wouldn't occur easily.

Conventional Example 1

According to a conventional method of using an organic matrix, the same reagent, polyethylene glycol (PEG 1000) as in Example 1 was analyzed. The MALDI mass spectrometer used herein was also the same as in Example 1. In this case, CHCA (α-cyano-4-hydroxybenzoic acid) was used as the organic matrix.

Figure 8:
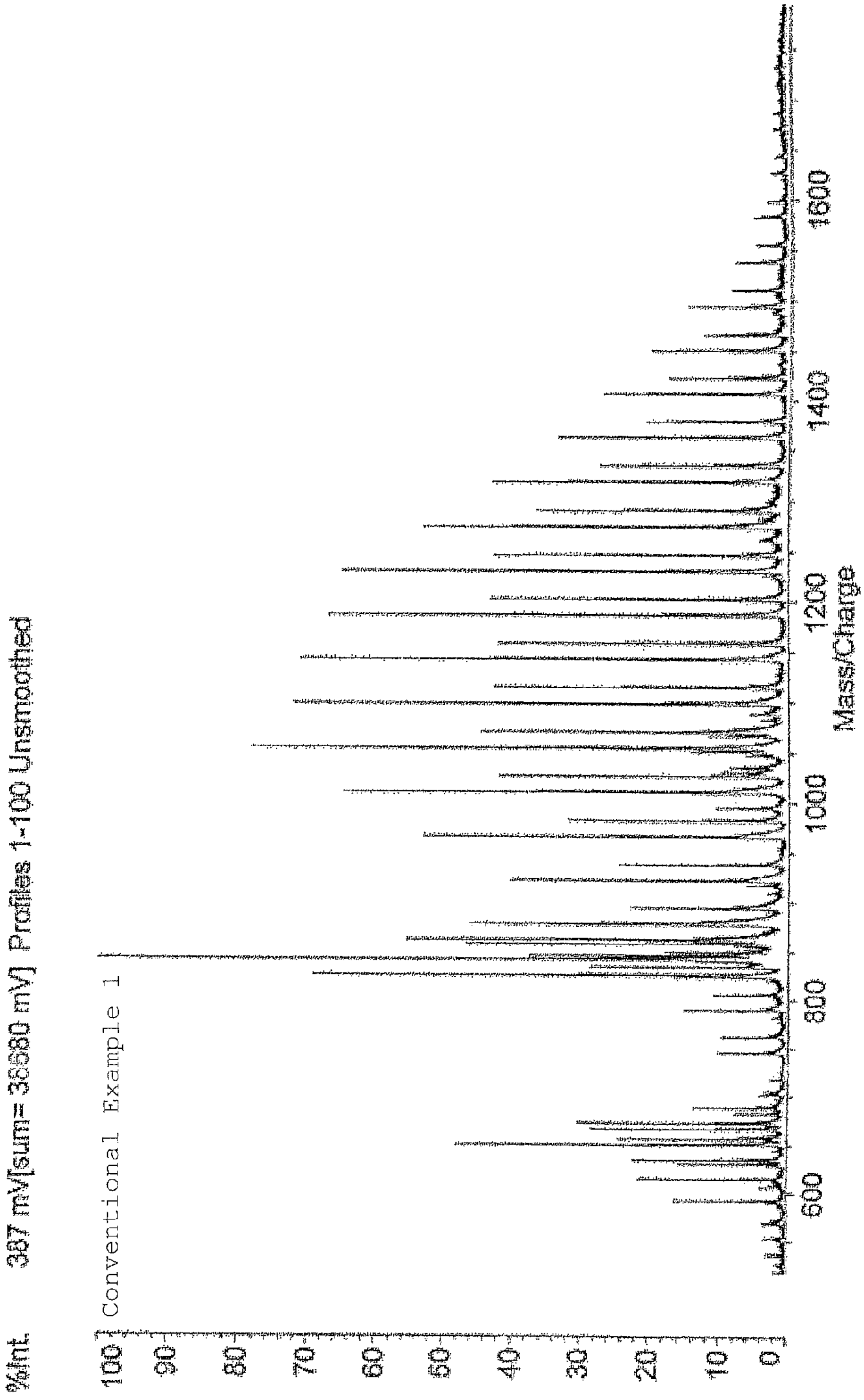
FIG. 8 is a molecular weight distribution spectrum showing the result of analysis in Conventional Example 1.

The result of analysis is shown in FIG. 8. Interfering ion peaks resulting from the organic matrix appeared, therefore detracting from accurate analysis of the sample molecules. In that manner, the method of using an organic matrix often involves some difficulties in case where a compound having a relatively low molecular weight of at most 1000 is an object to be analyzed.

Example 2

A sample was analyzed through mass spectrometry in the same manner as in Example 1, except that the analysis sample was a reagent polyethylene glycol having a larger molecular weight than in Example 1 (PEG 4000).

Figure 9:
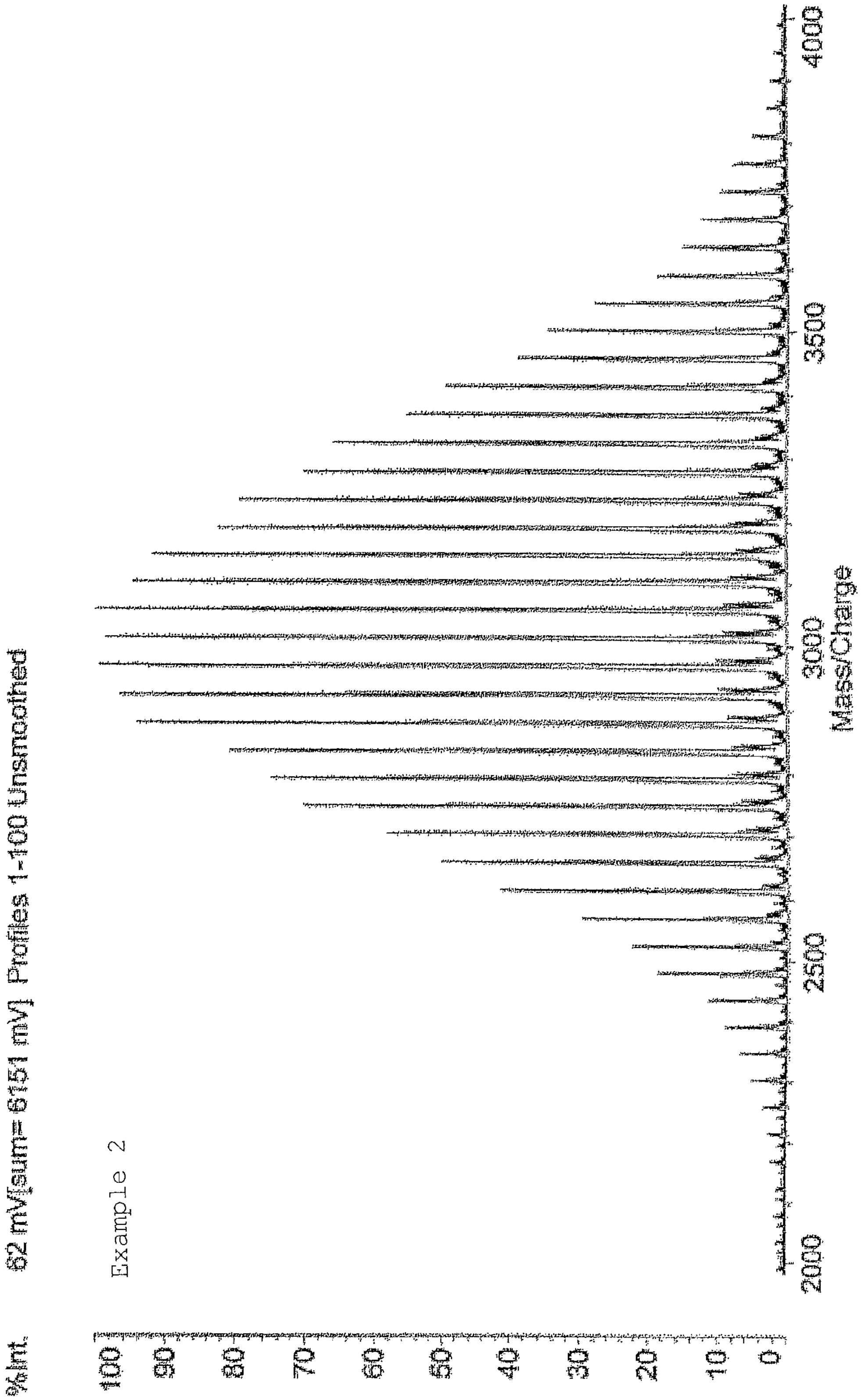
FIG. 9 is a molecular weight distribution spectrum showing the result of analysis in Example 2.

The result of analysis is shown in FIG. 9. A clear spectrum reflecting the normal distribution was obtained (and the noise level is extremely low. No interfering ion peaks are seen.

Also in this case, it may be presumed that the sample molecules could be adsorbed by the matrix particles nearly as similar to single-point adsorption on the specific uneven surfaces of the particles.

Comparative Example 2

A reagent, polyethylene glycol (PEG 4000) was analyzed according to the same method as in Example 2, for which, however, commercially-available CuO powder particles (the same as in Comparative Example 1) were used as the laser-beam-absorbing matrix, in place of the CuO secondary particles in Example 2.

Figure 10:
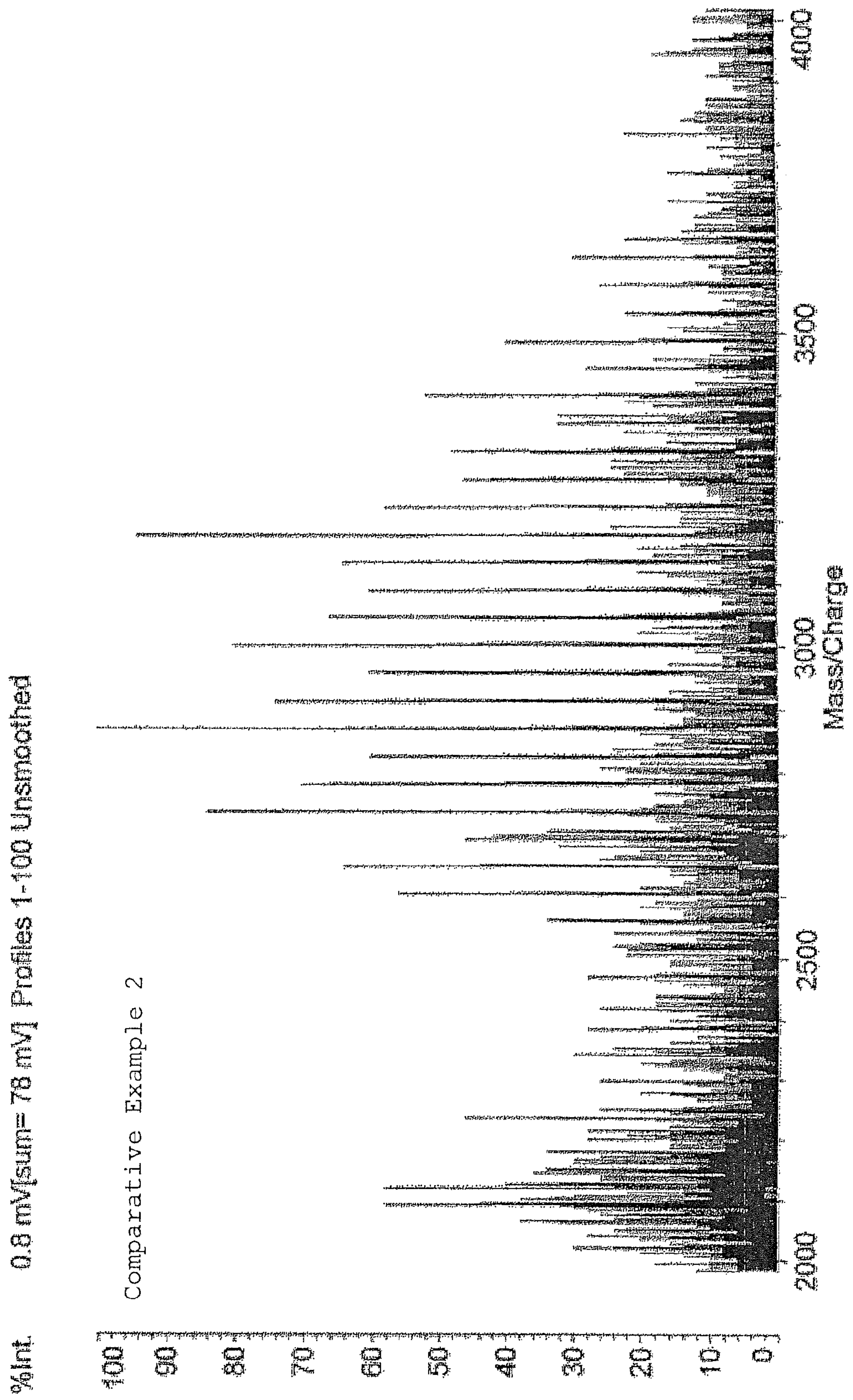
FIG. 10 is a molecular weight distribution spectrum showing the result of analysis in Comparative Example 2.

The result of analysis is shown in FIG. 10. The noise level much more increased than in Comparative Example 1 (FIG. 7).

It is presumed that, when smooth surface-having CuO matrix particles as herein are applied to a sample substance having a large molecular weight as in this example, then the degree of multipoint adsorption would increase much more.

Conventional Example 2

According to a conventional method of using an organic matrix, the same reagent, polyethylene glycol (PEG 4000) as in Example 2 was analyzed. The method for analysis is the same as in Conventional Example 1.

Figure 11:
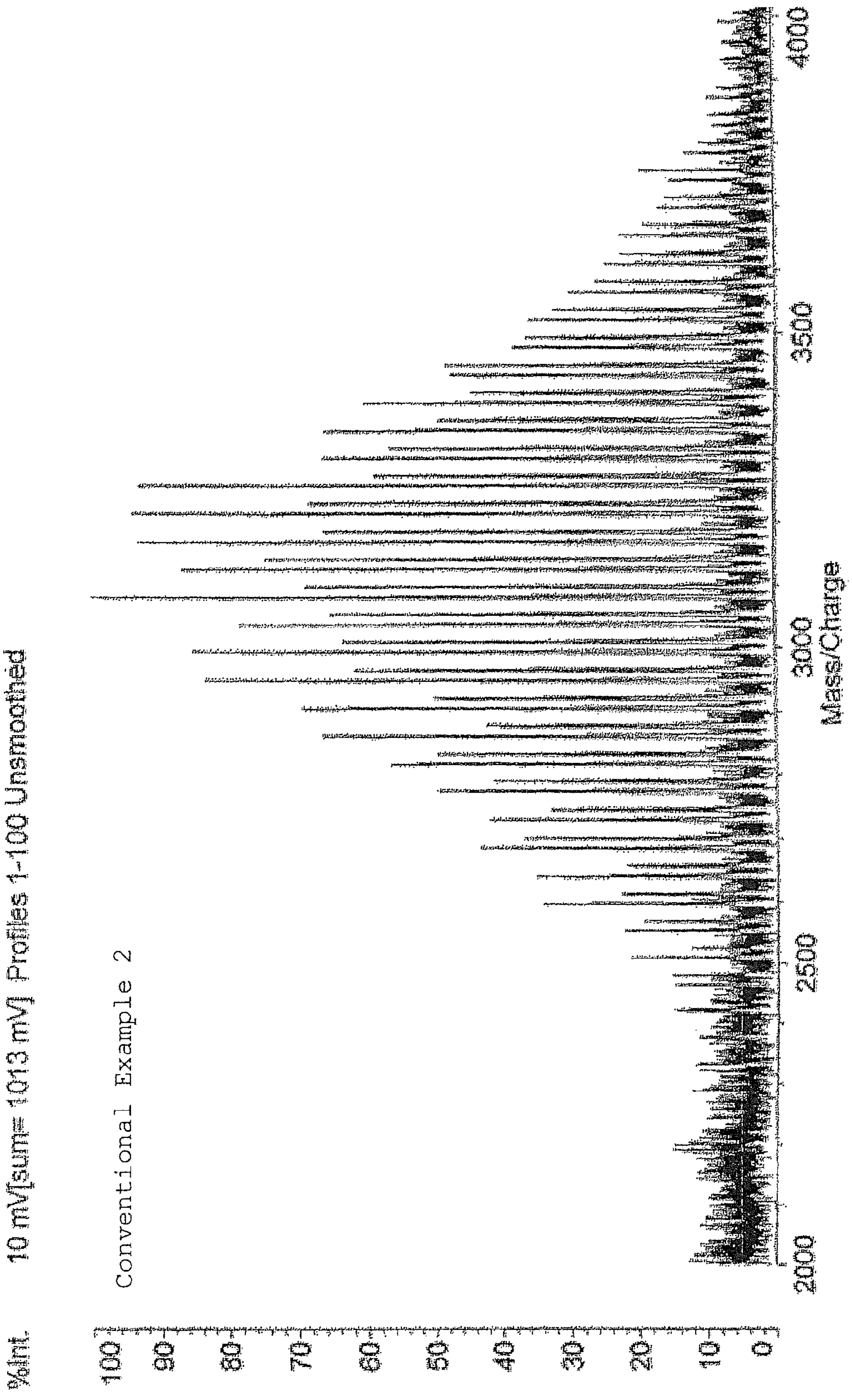
FIG. 11 is a molecular weight distribution spectrum showing the result of analysis in Conventional Example 2.

The result of analysis is shown in FIG. 11. Since the detection range is shifted toward the high molecular weight side, interfering ion peaks could not be seen; however, as compared with Example 2 (FIG. 9), many noises are detected and the accuracy in the normal distribution is somewhat poor.

Example 3

A sample was analyzed through mass spectrometry in the same manner as in Example 1 and 2, except that the analysis sample was a reagent polyethylene glycol having a larger molecular weight than in Example 2 (PEG 6000).

Figure 12:
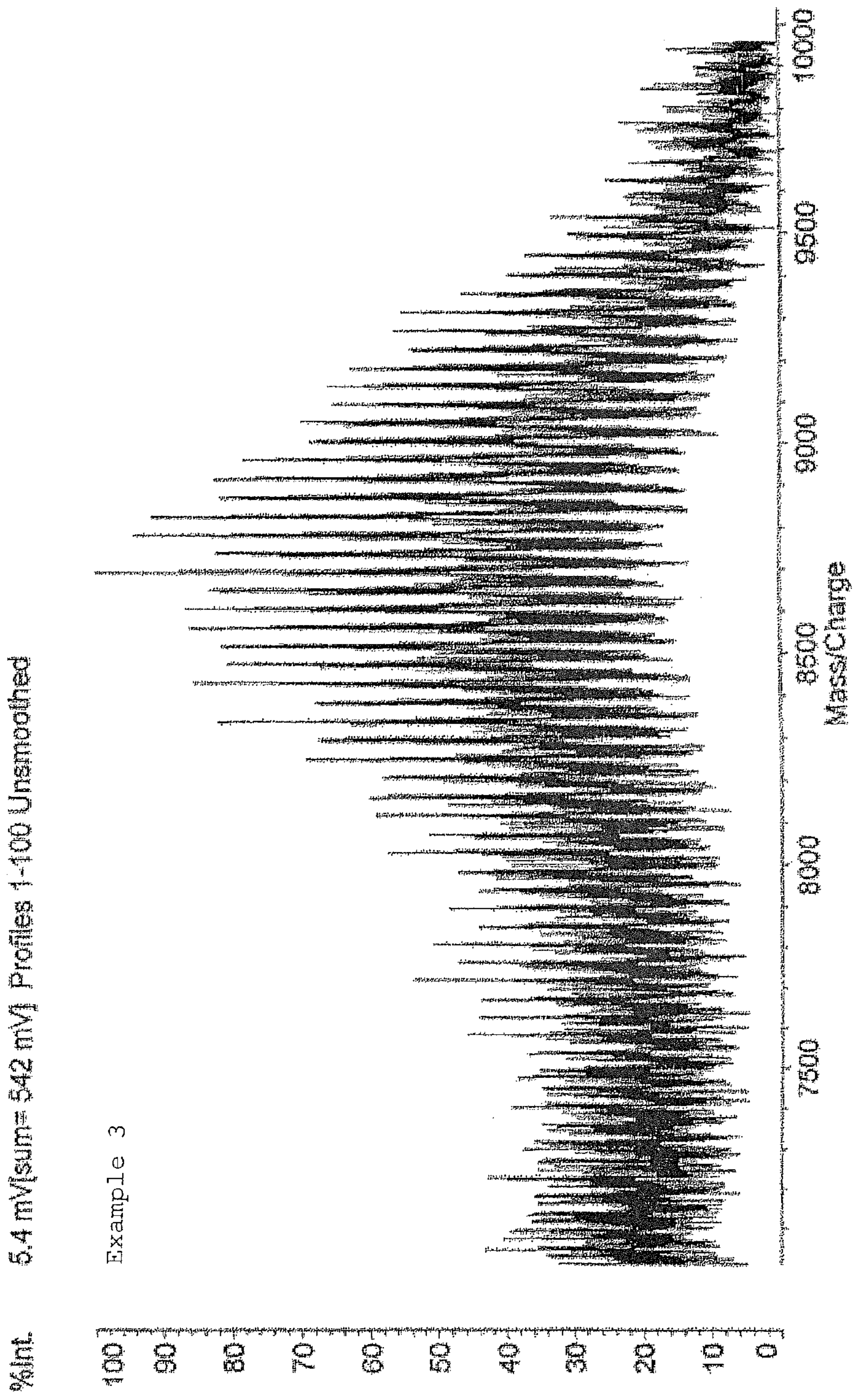
FIG. 12 is a molecular weight distribution spectrum showing the result of analysis in Example 3.

The result of analysis is shown in FIG. 12. Though the noise level increased, the existence of the sample substance (PEG 6000) could be sufficiently confirmed.

Comparative Example 3

A reagent, polyethylene glycol (PEG 6000) was analyzed according to the same method as in Example 3, for which, however, commercially-available CuO powder particles (the same as in Comparative Examples 1 and 2) were used as the laser-beam-absorbing matrix, in place of the CuO secondary particles in Example 3.

Figure 13:
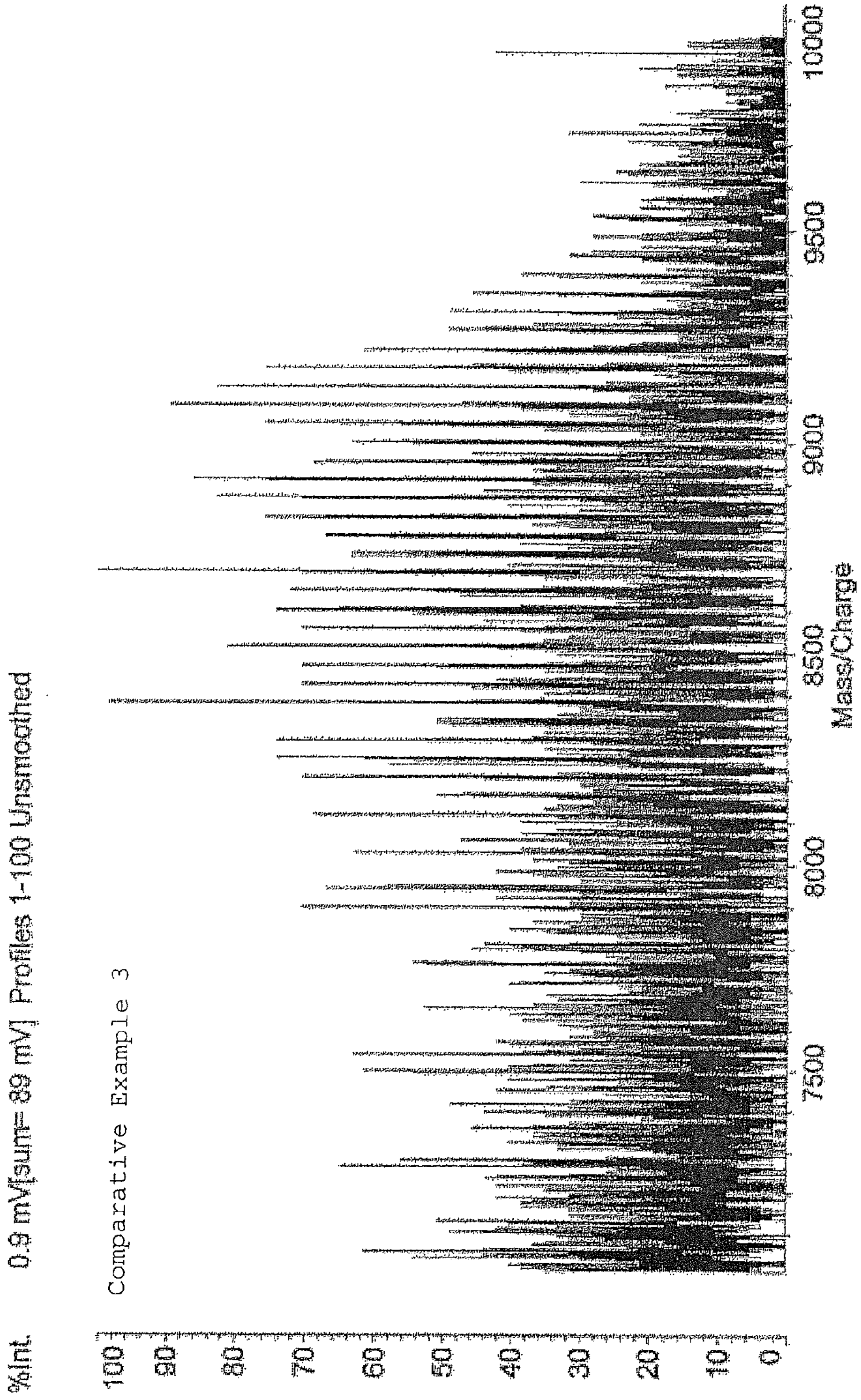
FIG. 13 is a molecular weight distribution spectrum showing the result of analysis in Comparative Example 3.

The result of analysis is shown in FIG. 13. As buried in noise peaks, the detection peaks of PEG 6000 could not almost be analyzed.

Conventional Example 3

According to a conventional method of using an organic matrix, the same reagent, polyethylene glycol (PEG 6000) as in Example 3 was analyzed. The method for analysis is the same as in Conventional Examples 1 and 2.

Figure 14:
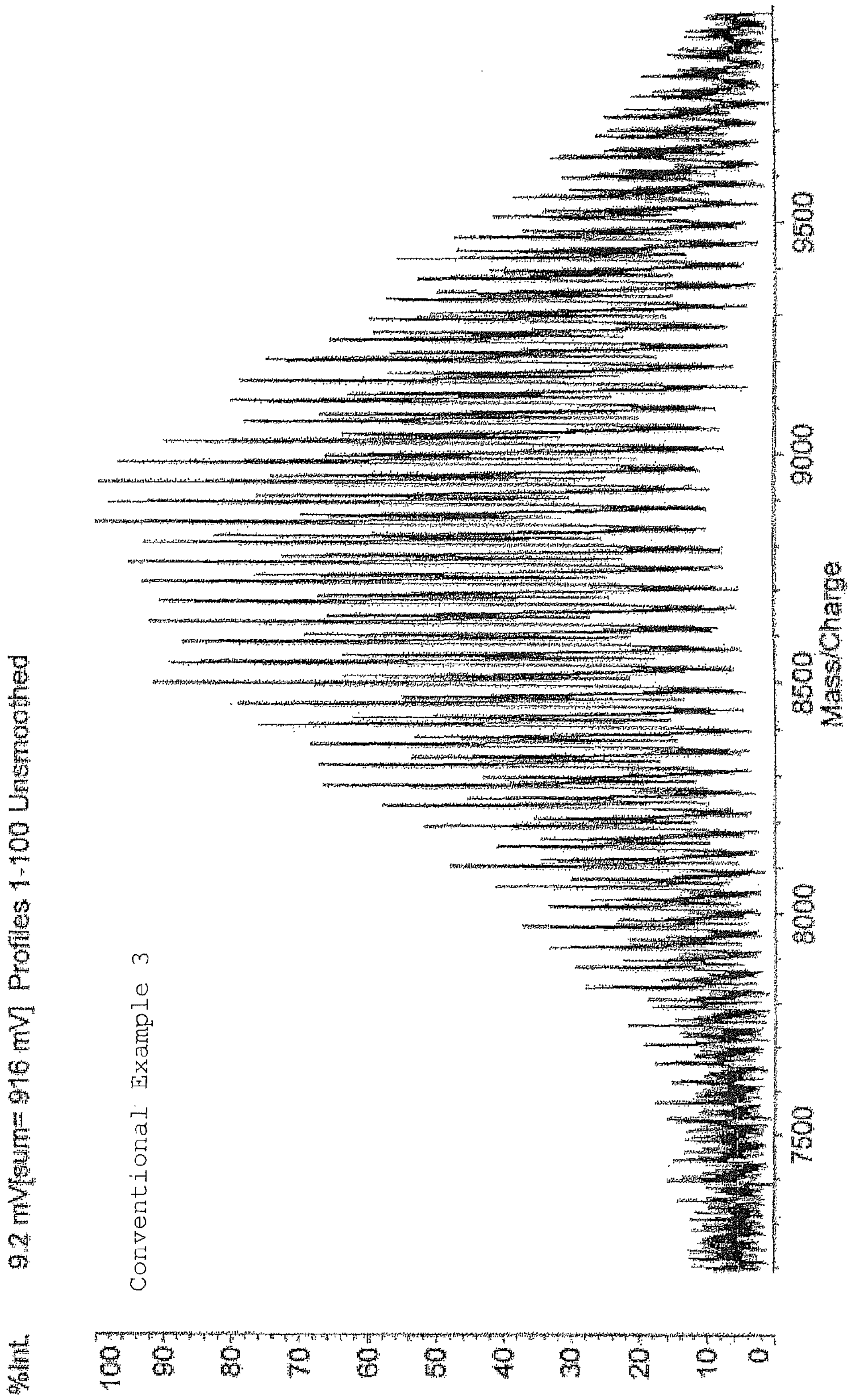
FIG. 14 is a molecular weight distribution spectrum showing the result of analysis in Conventional Example 3.

The result of analysis is shown in FIG. 14. In this case, the noise is smaller than in Example 3, and the normal distribution is reflected in a relatively good manner. It is known that conventional MALDI mass spectrometry using an organic matrix is advantageous for analysis of organic compounds having such a relatively large molecular weight.

Example 4

As a sample, DTAB (dodecyltrimethylammonium bromide) for use for surfactant or the like Was selected, and this was analyzed through mass spectrometry according to the method of the invention. The operation procedure was basically the same as in Example 1, except that the sample substance was changed. In this, however, five types of DTAB solutions each having a different concentration within a range of from 500 ng/mL to 50 pg/mL were prepared; and each DTAB solution was mixed with an NaI solution having the same concentration in a ratio of [DTAB solution]/[NaI solution]=5/1, thereby preparing five types of sample liquids each having a different DTAB concentration.

Figure 15:
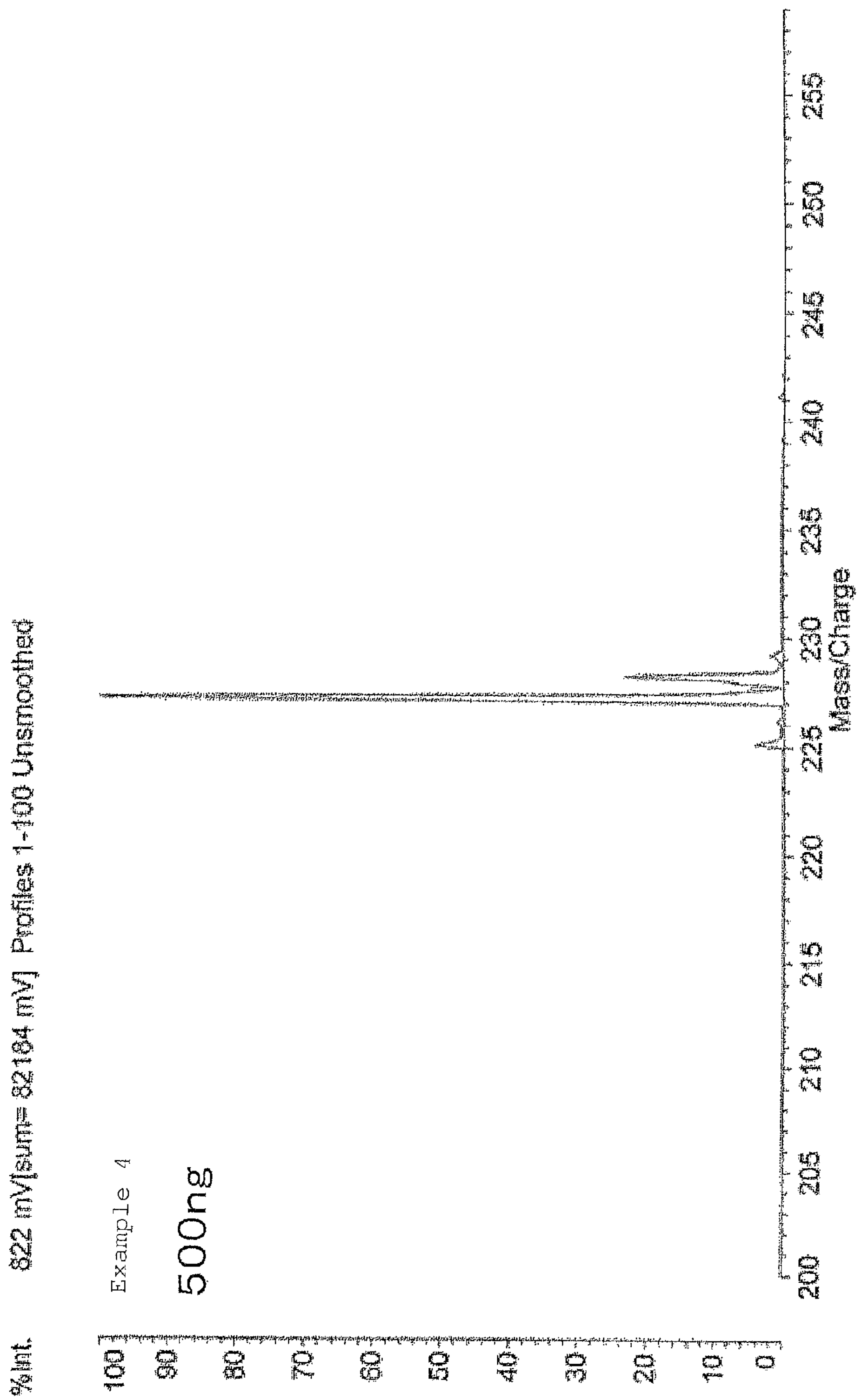
FIG. 15 is a molecular weight distribution spectrum showing the result of analysis of 500 ng/mL solution in Example 4.
Figure 16:
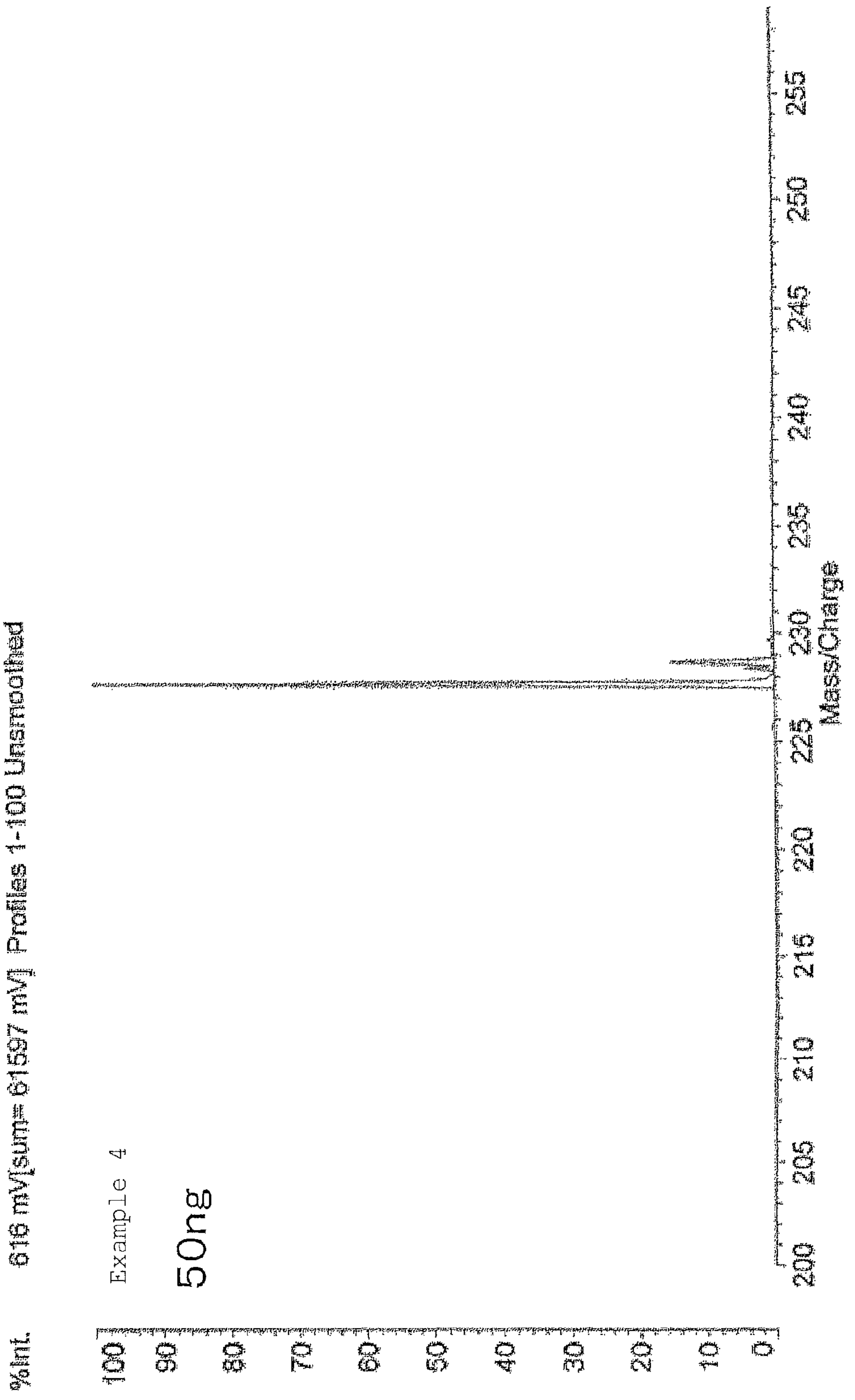
FIG. 16 is a molecular weight distribution spectrum showing the result of analysis of 50 ng/mL solution in Example 4.
Figure 17:
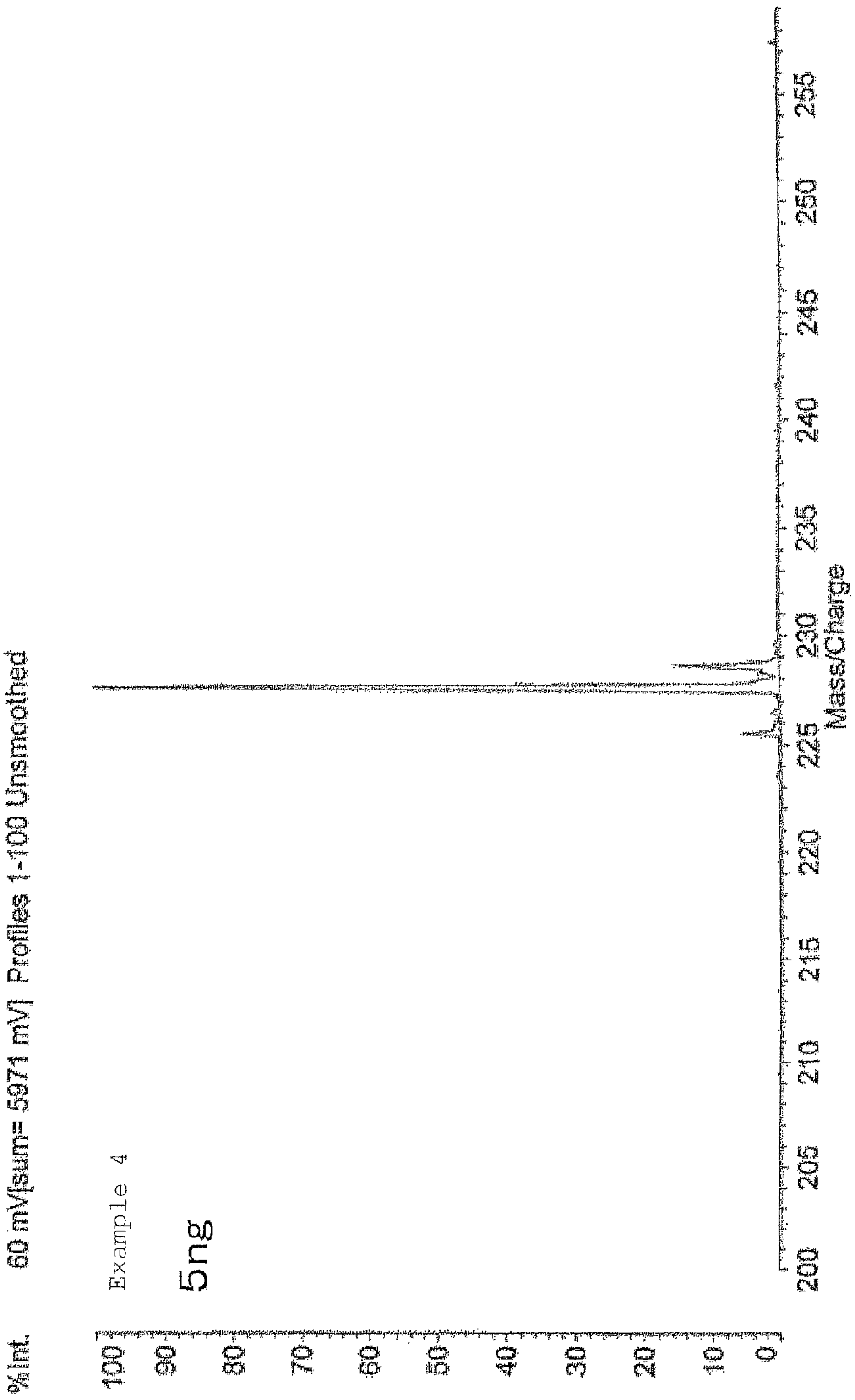
FIG. 17 is a molecular weight distribution spectrum showing the result of analysis of 5 ng/mL solution in Example 4.
Figure 18:
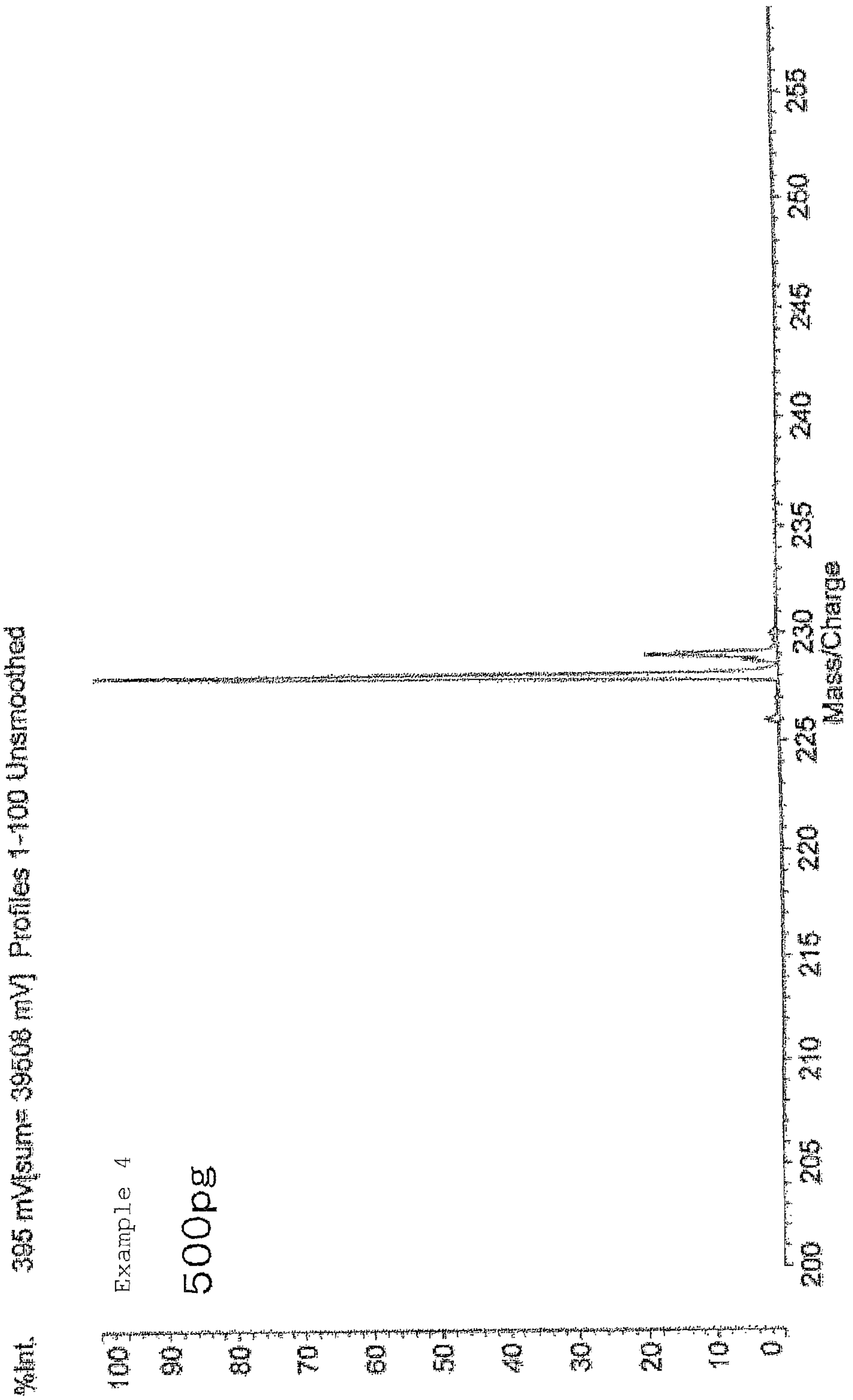
FIG. 18 is a molecular weight distribution spectrum showing the result of analysis of 500 pg/mL solution in Example 4.
Figure 19:
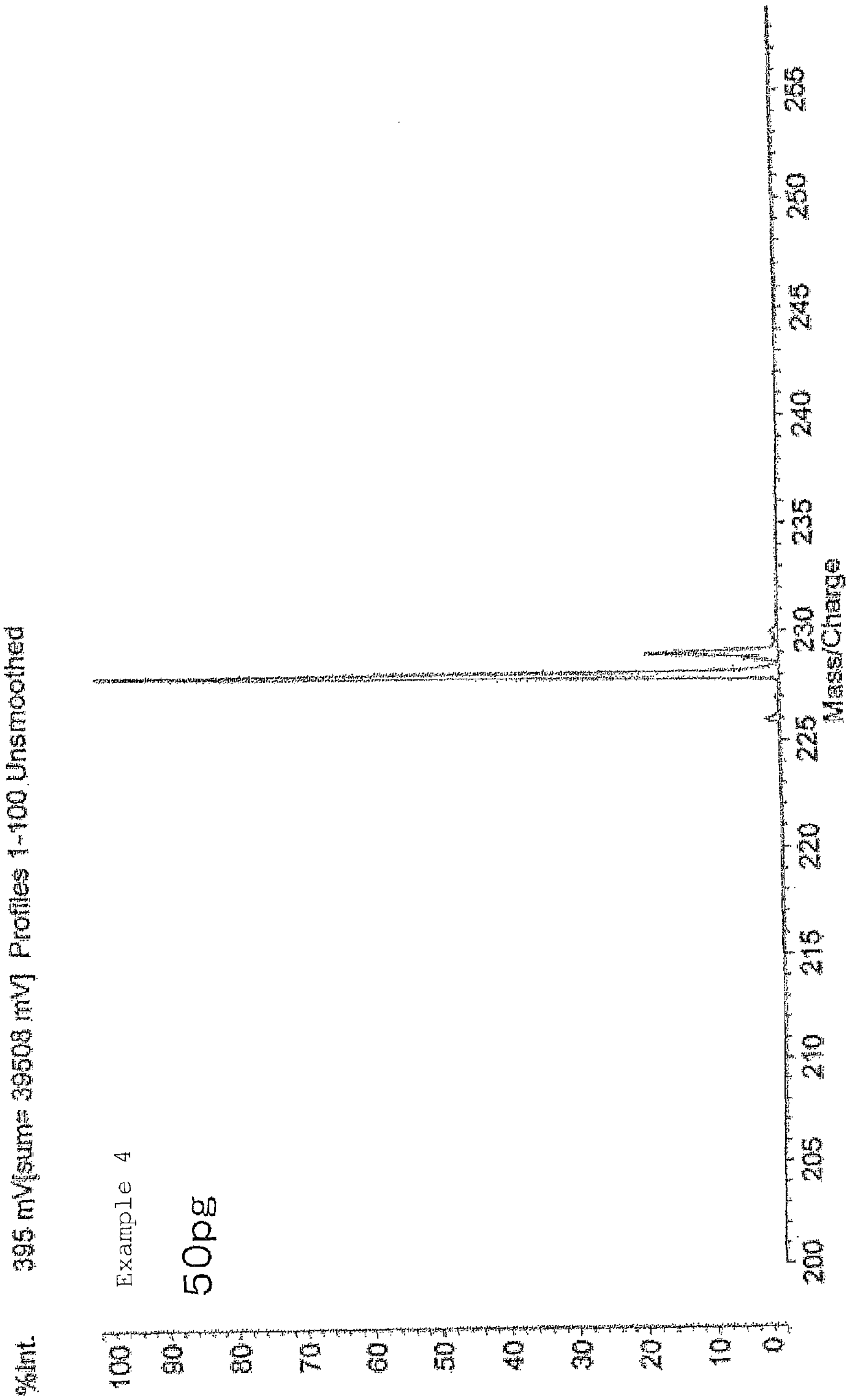
FIG. 19 is a molecular weight distribution spectrum showing the result of analysis of 50 pg/mL solution in Example 4.

The result of analysis is shown in FIG. 15 (concentration 500 ng/mL), FIG. 16 (concentration 50 ng/mL), FIG. 17 (concentration 5 ng/mL), FIG. 18 (concentration 500 pg/mL), and FIG. 19 (concentration 50 pg/mL). No interfering ion peaks are seen, and it has been confirmed that the substance having such a low molecular weight can be clearly analyzed. In addition, since the sample substance can be detected even in an extremely diluted solution thereof, it is believed that the invention is applicable to doping tests for human and livestock.

The invention claimed is:

1. A method of mass spectrometry comprising a step of dispersing CuO secondary particles each comprising an aggregate of CuO primary particles with an average particle diameter of 100 nm or smaller and having an uneven surface arising from the shape formed by the primary articles constituting the outermost surface of the secondary particle wherein the CuO secondary particle is derived from a CuO powder produced by baking basic copper carbonate in air at 200 to 300° C. and wherein the basic copper carbonate is produced in a process of mixing an aqueous ammonium hydrogen carbonate solution and an aqueous copper nitrate solution by a neutralizing operation wherein the aqueous ammonium hydrogen carbonate solution is stirred, and the aqueous copper nitrate solution is continuously added thereto, in a liquid medium; a step of applying the dispersion onto a sample substrate for MALDI mass spectrometry followed by drying it thereon to give a sample holder carrying the CuO secondary particles therein; a step of applying a sample solution of an organic compound (sample substance) to be analyzed, as dissolved therein, onto the CuO secondary particles-carrying sites of the sample holder followed by drying it thereon to make the sample substance adhere to CuO; and a step of setting the sample holder in a MALDI mass spectrometer followed by irradiating it with pulse laser so as to make the CuO secondary particles function as a laser-beam-absorbing matrix to ionize the sample substance.

2. The method of mass spectrometry as claimed in claim 1, wherein the sample substance is an organic compound having a molecular weight of from 100 to 5000.

* * * * *